(12) United States Patent
Laval et al.

(10) Patent No.: US 10,017,152 B2
(45) Date of Patent: Jul. 10, 2018

(54) ELECTRICAL STEERING COLUMN LOCK FOR AN AUTOMOTIVE VEHICLE

(71) Applicant: U-Shin Deutschland Zugangssysteme GmbH, Erdweg (DE)

(72) Inventors: Anthony Laval, Dachau (DE); Norbert Lehmeier, Ingolstadt (DE)

(73) Assignee: U-Shin Deutschland Zugangssyteme GmbH, Erdweg (DE)

( * ) Notice: Subject to any disclaimer, the term of this patent is extended or adjusted under 35 U.S.C. 154(b) by 125 days.

(21) Appl. No.: 14/432,913

(22) PCT Filed: Oct. 3, 2013

(86) PCT No.: PCT/EP2013/070632
§ 371 (c)(1),
(2) Date: Apr. 1, 2015

(87) PCT Pub. No.: WO2014/053598
PCT Pub. Date: Apr. 10, 2014

(65) Prior Publication Data
US 2015/0266449 A1    Sep. 24, 2015

(30) Foreign Application Priority Data

Oct. 4, 2012 (EP) .................................. 12187260
Oct. 4, 2012 (EP) .................................. 12187284
Mar. 13, 2013 (EP) .................................. 13159066

(51) Int. Cl.
*B60R 25/02* (2013.01)
*B60R 25/0215* (2013.01)
(Continued)

(52) U.S. Cl.
CPC ....... *B60R 25/02153* (2013.01); *F16H 25/18* (2013.01); *E05B 47/00* (2013.01);
(Continued)

(58) Field of Classification Search
CPC ............... Y10T 70/5664; Y10T 70/565; Y10T 70/5655; Y10T 74/188; Y10T 74/20636;
(Continued)

(56) References Cited

U.S. PATENT DOCUMENTS 4,413,491 A * 11/1983 Thirion ............. B60R 25/02147
70/186
5,454,238 A * 10/1995 Ross ................. B60R 25/02142
70/186
(Continued)

FOREIGN PATENT DOCUMENTS

DE   10 2005 027777 A1   12/2006
EP        1 967 424 A1    9/2008
EP        2476592 A1 *    7/2012 ......... B60R 25/0215

OTHER PUBLICATIONS

International Search Report issued in PCT/EP2013/070632 dated Nov. 5, 2013 (2 pages).

*Primary Examiner* — Suzanne L Barrett
(74) *Attorney, Agent, or Firm* — Osha Liang LLP

(57) ABSTRACT

An electrical steering column lock for an automotive vehicle capable of locking and unlocking the steering column is disclosed. The electrical steering column lock includes a bolt intended to move for locking and for unlocking the steering column, a cam wheel intended to rotate according a first rotation axis and to cooperate with the bolt for controlling the bolt movement, a gear intended to rotate according to a second rotation axis and disposed so as to drive the rotation of the cam wheel, where the cam wheel and the gear are placed sensibly in a common plane have parallel rotation axes which are also parallel to the movement of the bolt.

9 Claims, 2 Drawing Sheets

(51) Int. Cl.
  *F16H 25/18* (2006.01)
  *E05B 47/00* (2006.01)
(52) U.S. Cl.
  CPC ........ *Y10T 74/188* (2015.01); *Y10T 74/20636* (2015.01); *Y10T 74/20654* (2015.01)
(58) Field of Classification Search
  CPC ........ Y10T 74/20654; B60R 25/02153; B60R 25/02139; B60R 25/0211; B60R 25/02126; B60R 25/02156; B60R 25/02; F16H 25/18; E05B 47/00
  USPC .......................................... 70/182–186, 252
  See application file for complete search history.

(56) References Cited

U.S. PATENT DOCUMENTS

| | | | | |
|---|---|---|---|---|
| 5,489,134 A * | 2/1996 | Furuki | ...................... | B60J 7/04 292/DIG. 42 |
| 5,685,180 A * | 11/1997 | Qualters | ........... | B60R 25/02107 192/54.1 |
| 5,906,120 A * | 5/1999 | Thacker | ............ | B60R 25/02139 70/183 |
| 6,034,442 A * | 3/2000 | Mostrom | .......... | B60R 25/02147 180/287 |
| 6,053,067 A * | 4/2000 | Garnault | ........... | B60R 25/02113 192/223 |
| 6,324,878 B1 * | 12/2001 | Ramamurthy | .... | B60R 25/02153 292/144 |
| 6,998,731 B2 * | 2/2006 | Hayashi | ............ | B60R 25/02153 307/10.2 |
| 7,121,126 B2 * | 10/2006 | Zillmann | .......... | B60R 25/02153 70/186 |
| 8,505,346 B2 * | 8/2013 | Sugimoto | ......... | B60R 25/02153 70/186 |
| 2002/0088257 A1 * | 7/2002 | Dimig | ............... | B60R 25/02153 70/186 |
| 2004/0069027 A1 * | 4/2004 | Fukushima | ....... | B60R 25/02153 70/186 |
| 2004/0074266 A1 * | 4/2004 | Zillmann | .......... | B60R 25/02153 70/186 |
| 2004/0107750 A1 * | 6/2004 | Fukushima | ....... | B60R 25/02153 70/186 |
| 2005/0120761 A1 * | 6/2005 | Rouleau | ............ | B60R 25/02156 70/185 |
| 2005/0183476 A1 * | 8/2005 | Feucht | .............. | B60R 25/02153 70/186 |
| 2006/0070414 A1 * | 4/2006 | Limburg | ........... | B60R 25/02153 70/186 |
| 2006/0144184 A1 * | 7/2006 | Farmer | ............. | B60R 25/02153 74/492 |
| 2006/0169010 A1 * | 8/2006 | Limburg | ........... | B60R 25/02153 70/186 |
| 2006/0169011 A1 * | 8/2006 | Limburg | ........... | B60R 25/02153 70/186 |
| 2009/0007612 A1 * | 1/2009 | Laval | ................ | B60R 25/02142 70/271 |
| 2010/0206020 A1 | 8/2010 | Chen et al. | | |
| 2014/0069155 A1 * | 3/2014 | Laval | .................. | B60R 25/0215 70/183 |
| 2014/0124282 A1 * | 5/2014 | Laval | ................ | B60R 25/02153 180/287 |

\* cited by examiner

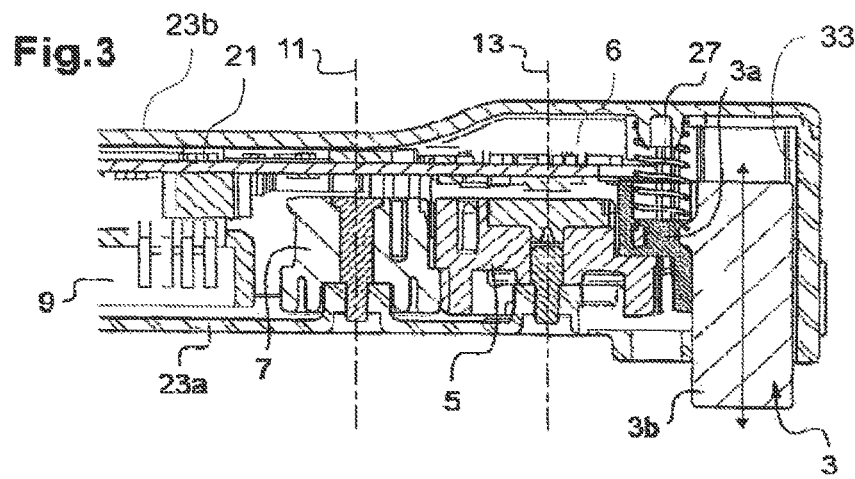
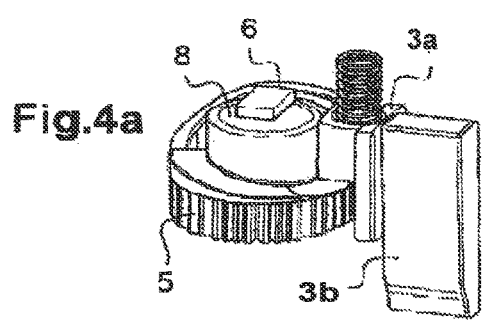
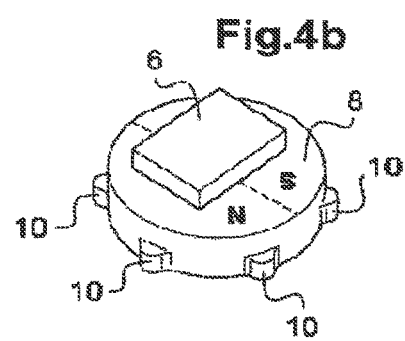
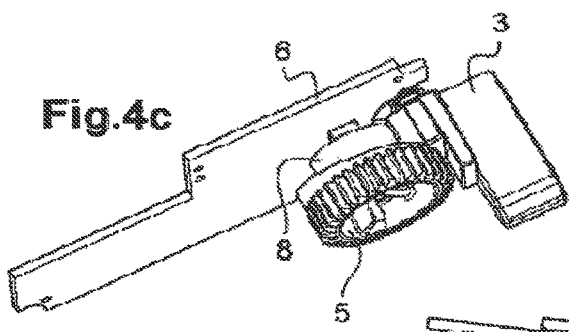
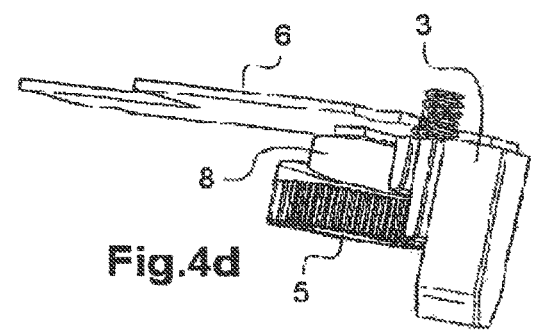

ELECTRICAL STEERING COLUMN LOCK FOR AN AUTOMOTIVE VEHICLE

The invention relates to an electrical steering column lock, also called ESCL, for an automotive vehicle capable of locking and unlocking the electrical steering column.

BACKGROUND

A column lock used in automotive vehicle usually comprises an electrical motor for controlling the movement of a bolt from a locking position to a rest position, in which the steering column is respectively blocked or unblocked which means free in rotation.

Such electrical steering column locks are placed in automotive vehicles for locking and unlocking the column lock, in an area where space is scarce and other elements (electronics, wires, etc.) are also implemented.

Therefore, there is a need for having an ESCL with high compactness.

SUMMARY OF INVENTION

According to an aspect, the invention has for object an ESCL comprising:
- a bolt intended to lock or to unlock the steering column,
- a cam wheel for controlling the bolt movement,
- a gear intended to be controlled by a motor and to control the rotation of the cam wheel, The cam wheel and the gear having parallel axes and are put on the same plane.

The motor is also put on the plane comprising the cam wheel and the gear.

The ESCL of the invention is well compact, reliable and efficient for locking and unlocking the steering column.

BRIEF DESCRIPTION OF DRAWINGS

Characteristics and advantages of the invention will appear at the reading of the description of the following figures, among which:

FIG. 3 is a cutaway view of a part of the ESCL of FIGS. 1 and 2, FIGS. 4a to 4d are mode detailed views of the positioning assembly of the embodiment of the previous figures.

On all figures, the same element is referred to with the same number.

DETAILED DESCRIPTION

Figure 1:
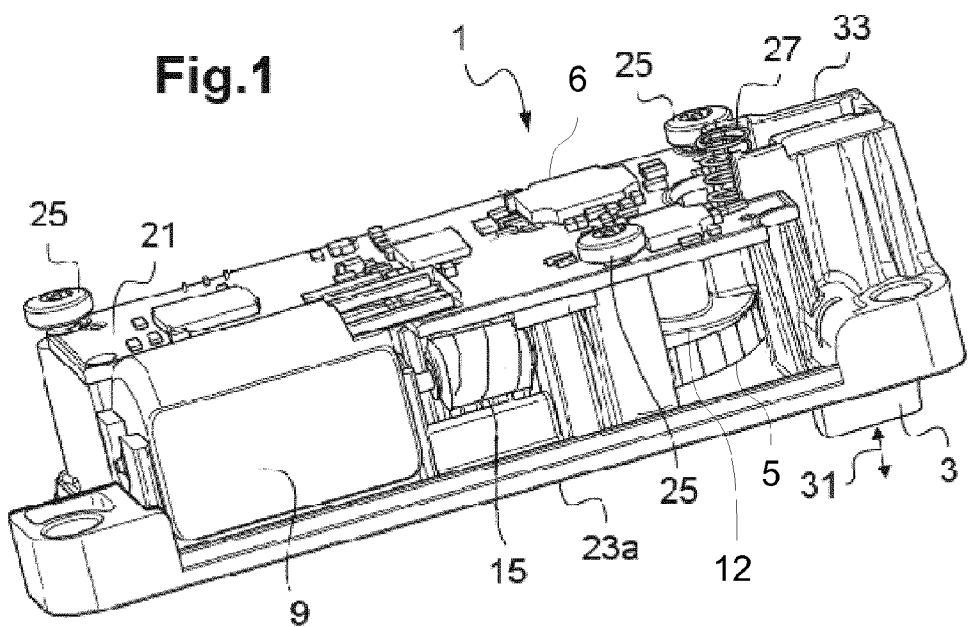
FIG. 1 is a schematic view of an embodiment of an ESCL according to the invention.

According to the invention, the ESCL 1 comprises:
- a bolt 3 intended to lock or to unlock the steering column (not illustrated)
- a cam wheel 5 for controlling the bolt movement,
- a gear 7 intended to be controlled by a motor 9 and to control the rotation of the cam wheel.

The cam wheel 5 and the gear 7 have parallel axes 11, 13 and are put on the same plane. Said axes 11, 13 are also parallel to the bolt 3 movement 31.

The motor 9 is also put on the common plane comprising the cam wheel 5 and the gear 7 and comprises a longitudinal axis contained in the common plane, the said longitudinal axis being sensibly perpendicular to the first and second rotation axes 11, 13.

Thanks to the configuration of the invention, the ESCL 1 presents a high compactness which enables to save space.

The motor 9 sets the gear 7 in motion via a worm gear 15 on its output shaft, meshing with teeth of said gear 7. The gear 7 in turn sets the cam wheel 5 in rotational motion by the meshing of teeth carried by said cam wheel 5 with the teeth of the gear 7.

The gear 7 is of a smaller diameter and features a smaller number of teeth than the cam wheel 5. As a consequence, the gear 7 acts as a reduction gear to adapt rotating speed and torque of the cam wheel 5.

An alternative embodiment (not shown) foresees that the worm gear 15 directly drives the cam wheel 5 without intermediary gear 7, so that the cam wheel 5 is controlled directly by the motor 9.

The cam wheel 5 features a helical ramp 12 (see FIG. 2) on one of its large axial sides. The bolt 3 is leaning on the helical ramp 12, pressed against it by elastic means 27, here a coil spring, and restricted to a translation movement by guiding means 33, here walls forming a corridor in which the bolt 3 moves. The resulting movement 31 direction of the bolt 3 driven by the helical ramp 12 is perpendicular to the plane containing the main components 5, 7, 9.

When the cam wheel 5 rotates, the bolt 3 slides along the helical ramp 12, and is consequently translated in the direction perpendicular to the plane containing the motor 9, gear 7 and cam wheel 5. This movement displaces the bolt 3 from a locking position in which the bolt 3 engages in the steering column so as to prevent its rotation, to an unlocked position in which the steering column may be rotated freely.

Furthermore, the helical ramp 12 may comprise a plurality of slope sections (not represented), with different inclination values. Due to the different inclination values, different translation speeds of the bolt 3 are caused at constant rotation speed of the cam wheel 5.

An example of such a helical ramp 12 comprises a first low inclination slope section, to set the bolt 3 progressively in motion. Then follows a high inclination slope section to quickly bring the bolt 3 to the locking position and a second low inclination slope section, to progressively slide the bolt in and out of the corresponding socket in the steering column in which it fits to lock said steering column.

The motor 9 is controlled by an electronic circuit, for example printed on a plate 21 called PCB.

Thanks to the configuration of the invention, is it possible to put the PCB 21 above the cam wheel 5 and the gear 7. As illustrated in FIG. 1, the PCB 21 is put on a plane sensibly parallel to the one perpendicular to the respective axes 11, 13 of the cam wheel 5 and the gear 7 and passing through the center of said cam wheel 5 and gear 7. The PCB 21 may also be put on one side of the ESCL.

The printed circuit board 21 comprises a flat resin body on which copper or metallic current paths are printed, and with electronic elements attached here in particular on the side opposite to the motor 9, gear 7 and cam wheel 5.

The printed circuit board 21 carries an electric circuit, in the depicted example on its side opposed to the aforementioned main components (motor 9, gear 7, cam wheel 5), configured to drive the motor 9 according to specific instructions.

If the space between the printed circuit board and the underlying main components (motor 9, gear 7, cam wheel 5) permits, the other side of the printed circuit board 21 may carry at least a part of the electric circuit.

The ESCL 1 of the invention is electrical since the actuation of the lock is made by electronics.

Figure 2:
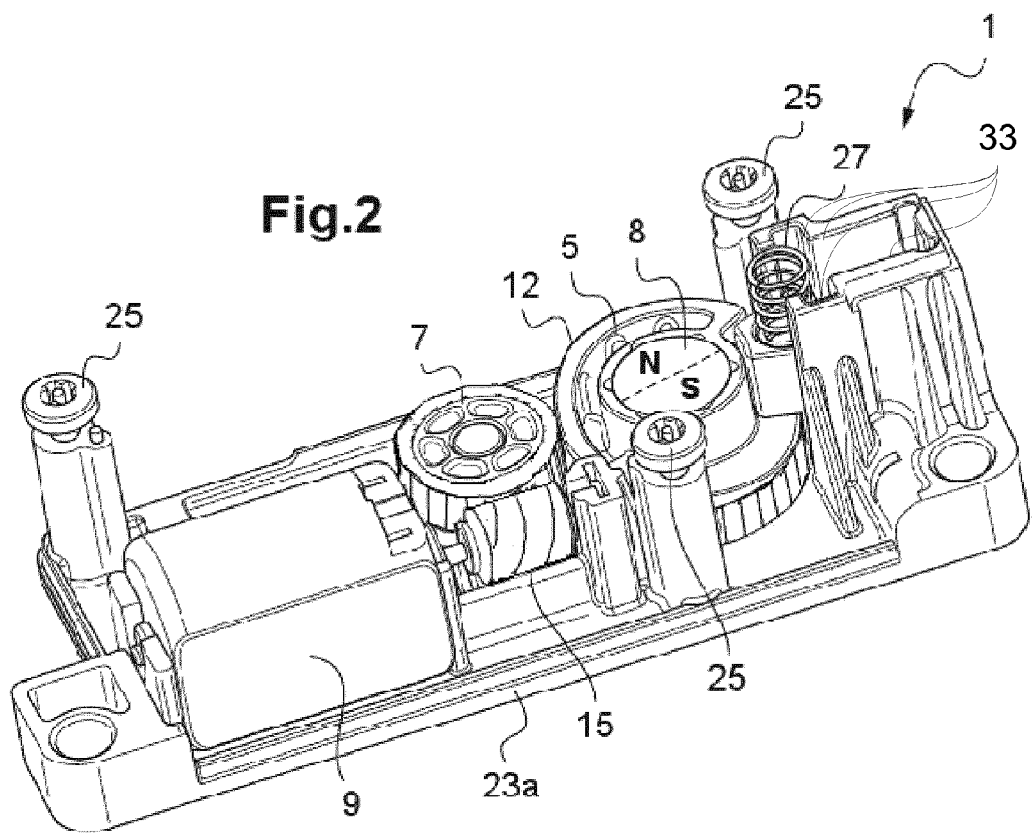
FIG. 2 is another view of the embodiment of FIG. 1, part of which has been removed.

As illustrated in FIGS. 1 to 3, the housing may be made in two parts. The motor 9, gear 7, cam wheel 5, bolt 3 and elastic means 13 are contained in the housing, between the two parts 23a and 23b.

The part intended to be in contact with the steering column may be made in Zamac®, the other part may be made in a plastic material, for example. Zamac® is an alloy comprising zinc and alloying elements of aluminium, magnesium and copper.

The housing receives one or a plurality of fixing means, such as screw 25.

The fixing means 25 may be used for fixing the PCB 21 in the housing.

The fixing means 25 may be used to attach the printed circuit board 21 to the housing in parallel or in addition to the relative attaching of the housing parts 23a, 23b.

The bolt 3 is associated with elastic means 27, for example a spring. If the spring is a compression spring, the said elastic means 27 is placed according to an axis sensibly parallel to the movement direction 31 of the bolt.

If the spring is a torsion spring, the axis of said spring is disposed perpendicular to the movement direction 31 of the bolt.

The housing may advantageously comprise two guiding means 33.

The said guiding means may delimit a recess intended to receive an appendix (not illustrated) belonging to the bolt 3 capable of sliding along the said guiding means when the bolt 3 moves along the movement direction 31 for locking or unlocking the steering column.

As illustrated in FIG. 3, the bolt 3 may be made in one piece or several parts, for example two parts 3a and 3b connected to each other so that each part 3a and 3b performs the same movement. A part 3a may be made in Zamac® or plastic, and the other part 3b engaging in the steering column may be made in a resilient material such as steel, for solidity purpose.

According to the illustrated embodiment, only the bolt part 3a receives the elastic means 27.

The cam wheel 5 for controlling the movement of the bolt 3 may be a gear with teeth or spur gear teeth on lower side. A part of the bolt 3, for example the part 3a, cooperates with the said cam wheel 5 enabling the controlling of the movement of the bolt 3.

The said cam wheel 5 is rotatable around the axis 13.

The gear 7 is configured for rotating around the axis 11. The axis 13 and the axis 11 are sensibly parallel. The cam wheel 5 and the gear 7 are put sensibly on the same plane which means that the median plane of gear 7 sensibly perpendicular to axis 13, 11 is the same median plane of cam wheel 5.

The gear 7 transmits with a specific gear ratio the rotation of the motor 9 to the cam wheel 5.

The cam wheel 5 comprises an assembly for determining the position of the rotation of the cam wheel 5. The said assembly comprises a sensor 6 such as a Hall effect position sensor, associated with a magnet 8 typically comprising a plurality of north and south magnetic poles. Advantageously, the output of the sensor 6 may be used for controlling the motor driving the cam wheel 5.

The sensor may have any shape suitable for detecting the position of the magnet, specifically the position of the poles. The said sensor may be put on the electric circuit printed on a plate which is able to control the movement of the motor.

In the depicted embodiments the magnet 8 comprises one north-south magnetic dipole, like on the figures, with two magnetic poles N, S respectively north and south.

The Hall effect position sensor 6, advantageously placed on the printed circuit board 21, delivers a voltage which is a known function of the relative rotational position of the sensor 6 and magnet 8. Since the sensor 6 is fixed, it measures the rotational position of the cam wheel 5. From the determining of the position over time, the rotation speed of the cam wheel 5 can be deduced. Knowledge of the rotational speed allows to adjust the braking action of a braking device to the current speed in order to reach more precisely specific cam wheel 5 positions.

The differentiated dipole N, S is then used as a position indicator.

Typically, the magnet may be put on one of the two largest side of the cam wheel 5 which enables to have a better compactness. Therefore, the magnet 8 may have any shape which enables a complementary with the shape of the side of the cam wheel 5. As illustrated (see FIGS. 1 and 4a to 4d), the magnet is sensibly a disc with one or several blades 10, protruding in a radial direction, which enable the said magnet to closely follow the rotation of the cam wheel 5. The magnet 8 is here inserted in a complementary housing on one of the two largest, axial sides of the cam wheel 5. The said cam wheel 5 may present two parts. The first part configured for receiving the magnet 8 and the second part configured for being controlled by a gear or a motor.

It is then possible to add a braking device (not illustrated), for example controlled by the electronics, for braking or stop the movement of the cam wheel 5 in dependency of the rotation speed of the cam wheel 5. For example, an earlier braking is done at faster rotation speed whereas a late braking is done at slow rotation speed.

The ESCL of the present invention presents the advantages of allowing both precise angular movement detection and precise angular position detection which allows:

- speed detection for position control of lock bolt, in order to avoid undue driving by the motor 9, and thus avoid potential damage,
- better error detection plausibility, for improved diagnostics functions of critical safety conditions of the ESCL,
- quick detection of blocked column situation, for stopping the motor 9 in time before damage occurs (and thus potentially decreased motor driver components due to lower thermal load since avoiding motor overload),
- correct position detection even after voltage interruption, to avoid false assumed positions of the cam wheel 5, which may lead to undue driving by the motor 9,
- high diagnostic possibilities of sensor failures.

The advantages of the absolute sensor is the subsequent speed control, the knowledge of the position in real time and it enables to stop the motor before reaching extremal positions in which pieces may undergo important stress.

The invention claimed is:

1. An electrical steering column lock for an automotive vehicle capable of locking and unlocking a steering column, comprising:
   a bolt that moves to lock and unlock the steering column;
   a cam wheel that rotates according a first rotation axis and cooperates with the bolt to control the movement of the bolt; and
   a gear that rotates according to a second rotation axis and drives the rotation of the cam wheel;
   wherein the cam wheel and the gear are placed in a common plane, the first rotation axis is parallel to the second rotation axis, and the first rotation axis and the second rotation axis are parallel to the movement of the bolt, and wherein a helical ramp of the cam wheel drives the bolt, and the movement of the bolt is restricted to a translation movement by a guiding means.

2. The electrical steering column lock according to claim 1, wherein the gear rotation is controlled by a motor, the motor comprising a longitudinal axis contained in the common plane and the longitudinal axis being perpendicular to the first and second rotation axes.

3. The electrical steering column lock according to claim 1, wherein the cam wheel and the gear are contained in a common plane, and the electrical steering column lock further comprises a flat printed circuit board disposed on a plane parallel to the common plane.

4. The electrical steering column lock claim 1, wherein the gear has a smaller number of teeth than the cam wheel to adapt the rotating speed and torque of the cam wheel.

5. The electrical steering column lock according to claim 3, further comprising an assembly for determining an absolute rotation position of the cam wheel while the cam wheel is rotating.

6. The electrical steering column lock according to claim 5, wherein the assembly for determining the absolute rotation position of the cam wheel comprises a Hall effect position sensor and a magnet.

7. The electrical steering column lock according to claim 6, wherein the absolute rotation position Hall effect sensor is placed on the printed circuit board and wherein the magnet is placed on the cam wheel.

8. The electrical steering column lock according to claim 6, wherein the magnet is a disc with one or several blades, to enable the magnet to follow the rotation of the cam wheel.

9. The electrical steering column lock according to claim 6, wherein the magnet comprises a plurality of north-south magnetic dipoles.

* * * * *